US010051037B2

(12) United States Patent
Konuk et al.

(10) Patent No.: US 10,051,037 B2
(45) Date of Patent: *Aug. 14, 2018

(54) METHODS AND SYSTEMS FOR DYNAMICALLY PROVISIONING RESOURCES FOR ON-DEMAND COURSES

(71) Applicant: Google Inc., Mountain View, CA (US)

(72) Inventors: Enis Konuk, Carlisle, MA (US); Nidhi Aggarwal, Brookline, MA (US); Kenneth Sauter, Sudbury, MA (US); Jitesh Shetty, Brookline, MA (US); David Tzu-Wei Chen, Wrentham, MA (US)

(73) Assignee: Google LLC, Mountain View, CA (US)

( * ) Notice: Subject to any disclaimer, the term of this patent is extended or adjusted under 35 U.S.C. 154(b) by 1378 days.

This patent is subject to a terminal disclaimer.

(21) Appl. No.: 13/944,530

(22) Filed: Jul. 17, 2013

(65) Prior Publication Data
US 2014/0025721 A1    Jan. 23, 2014

Related U.S. Application Data

(60) Provisional application No. 61/672,811, filed on Jul. 18, 2012.

(51) Int. Cl.
*G06F 13/00* (2006.01)
*H04L 29/08* (2006.01)
(Continued)

(52) U.S. Cl.
CPC .............. *H04L 67/10* (2013.01); *H04L 47/70* (2013.01); *H04L 67/1012* (2013.01);
(Continued)

(58) Field of Classification Search
CPC ....... H04L 67/10; H04L 47/70; H04L 47/826; H04L 67/42; H04L 67/1036; H04L 67/22; H04L 67/2842; H04L 67/1012
(Continued)

(56) References Cited

U.S. PATENT DOCUMENTS 8,261,295 B1  9/2012  Risbood et al.
8,868,639 B2  10/2014  Raleigh et al.
(Continued)

OTHER PUBLICATIONS

Non-Final Office Action issued in related U.S. Appl. No. 13/944,482, filed Jul. 17, 2013, dated Feb. 26, 2016, Konuk et al., 7 pages.
(Continued)

*Primary Examiner* — Kenneth R Coulter
(74) *Attorney, Agent, or Firm* — Lerner, David, Littenberg, Krumholz & Mentlik, LLP

(57) ABSTRACT

A method for providing access to dynamically provisioned resources and on-demand courses includes receiving, by an instantiation engine executing on a first computing device, from a second computing device associated with a user, an indication that the user has purchased access to the course at a scheduled time. A type of computing resource is identified for use during the course at the scheduled time. A service provider computing device is selected from a plurality of service provider computing devices, based upon an ability to provide access to the identified type of computing resource at the scheduled time. Before the scheduled time, the instantiation engine instructs the selected service provider computing device to provision a computing resource of the identified type. The method includes transmitting, to the second computing device, an instruction to establish a connection to the provisioned computing resource at the scheduled time.

5 Claims, 10 Drawing Sheets

(51) Int. Cl.
*H04L 12/911* (2013.01)
*H04L 29/06* (2006.01)
(52) U.S. Cl.
CPC .......... *H04L 67/1036* (2013.01); *H04L 67/42* (2013.01); *H04L 47/826* (2013.01); *H04L 67/22* (2013.01); *H04L 67/2842* (2013.01)
(58) Field of Classification Search
USPC ................ 709/226, 201, 229, 217–219, 231; 434/350–352; 718/102, 104, 105
See application file for complete search history.

(56) References Cited

U.S. PATENT DOCUMENTS

| | | |
|---|---|---|
| 9,674,270 B2 * | 6/2017 | Konuk .................... H04L 67/10 |
| 2012/0240135 A1 | 9/2012 | Risbood et al. |
| 2012/0266159 A1 | 10/2012 | Risbood et al. |
| 2013/0238751 A1 | 9/2013 | Raleigh et al. |
| 2013/0238761 A1 | 9/2013 | Raleigh et al. |
| 2014/0123129 A1 | 5/2014 | Risbood et al. |

OTHER PUBLICATIONS

Non-Final Office Action issued in related U.S. Appl. No. 13/944,482, filed Jul. 17, 2013, dated Oct. 7, 2016, Konuk et al., 6 pages.

* cited by examiner

METHODS AND SYSTEMS FOR DYNAMICALLY PROVISIONING RESOURCES FOR ON-DEMAND COURSES

CROSS-REFERENCE TO RELATED APPLICATIONS

This application claims priority from U.S. Provisional Patent Application Ser. No. 61/672,811, filed on Jul. 18, 2012, entitled "Methods and Systems for Dynamically Provisioning Resources for On-Demand Courses," which is hereby incorporated by reference.

BACKGROUND

The disclosure relates to provisioning computing resources. More particularly, the methods and systems described herein relate to functionality for dynamically provisioning resources for on-demand courses.

Every year small, medium, and large enterprise systems and application software companies release new software. A new software release typically requires customer explanation and training. Training for major software releases conventionally takes the form of classroom instruction including "hands-on" training labs.

"Hands-on" training lab instruction is often made available in classrooms or at events such as trade shows, sales meetings, partner sales meetings, user group meetings, and technical conferences. Training labs are usually created by vendors or by their training affiliates. Annually, hundreds of thousands of "hands-on" training labs are delivered.

For the technical community of vendors, partners, and users, hands-on training lab instruction is often an extremely valuable and effective form of instruction. However, staging hands-on training labs is often an expensive proposition including significant acquisition costs for systems, software, and maintenance. Logistics for students and for the provisioning and configuration of systems are often both complex and time consuming. With a lack of common tools, content creation and the distribution of that content can also be difficult to coordinate. Often technical employees or volunteers provide the content and infrastructure for training labs, but once the training lab has been given the physical infrastructure is removed and electronic versions of the training labs are typically destroyed.

SUMMARY

In one aspect, a method for dynamically provisioning resources for an on-demand course at a scheduled time includes receiving, by an instantiation engine executing on a first computing device, from a second computing device associated with a user, an indication that the user has purchased access to a course at a scheduled time. The method includes identifying, by the instantiation engine, a type of computing resource for use during the course at the scheduled time. The method includes selecting, by the instantiation engine, a service provider computing device from a plurality of service provider computing devices, based upon an ability of the selected service provider computing device to provide, to the second computing device, access to the identified type of computing resource at the scheduled time. The method includes, before the scheduled time, instructing, by the instantiation engine, the selected service provider computing device to provision a computing resource of the identified type. The method includes transmitting, by the instantiation engine, to the second computing device, an instruction to establish a connection to the provisioned computing resource at the scheduled time.

In another aspect, a method for dynamically provisioning resources for an on-demand course to multiple users includes receiving, by an instantiation engine executing on a first computing device, from a second computing device associated with a user, a request to access a course. The method includes identifying, by the instantiation engine, a type of computing resource for use during the course. The method includes selecting, by the instantiation engine, a service provider computing device from a plurality of service provider computing devices, based upon an ability of the selected service provider computing device to provide, to the second computing device, access to the identified type of computing resource. The method includes instructing, by the instantiation engine, the selected service provider computing device to provision a computing resource of the identified type. The method includes transmitting, by the instantiation engine, to the second computing device, an instruction to establish a connection to the provisioned computing resource. The method includes receiving, by the instantiation engine, from a third computing device associated with a second user, a second request to access the course. The method includes selecting, by the instantiation engine, a second service provider computing device from the plurality of service provider computing devices, based upon an ability of the second service provider computing device to provide, to the third computing device, access to the identified type of computing resource for use during the course. The method includes instructing, by the instantiation engine, the second service provider computing device to provision a second computing resource of the identified type. The method includes transmitting, by the instantiation engine, to the third computing device, an instruction to establish a connection to the provisioned second computing resource.

In still another aspect, a method for providing access to a dynamically provisioned resource and an on-demand course includes receiving, by a creation engine executing on a first computing device, from a second computing device associated with a user, a request to create a course. The method includes receiving, by the creation engine, from the second computing device, an identification of a type of computing resource for use during the course. The method includes selecting, by the creation engine, a service provider computing device from a plurality of service provider computing devices based upon an ability of the selected service provider computing device to provide, to the second computing device, access to the identified type of computing resource. The method includes instructing, by the creation engine, the service provider computing device to provision a computing resource of the identified type. The method includes directing, by the creation engine, the second computing device to connect to the provisioned computing resource. The method includes receiving, by the creation engine, from the second computing device, an indication that the user configured the provisioned computing resource for use during the course. The method includes directing, by the creation engine, the service provider computing device to save a state of the provisioned computing resource and metadata associated with the course, responsive to the received indication. The method includes providing access to the saved state of the provisioned computing resource and the metadata associated with the course. In one embodiment, the method includes providing a subscription for accessing the saved state and the metadata. In another embodiment, the method includes offering for sale a copy of the saved state and the metadata.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

In some embodiments, the methods and systems described herein provide functionality for dynamically provisioning resources for on-demand courses. Before describing these methods and systems in detail, however, a description is provided of a network in which such methods and systems may be implemented.

Figure 1A:
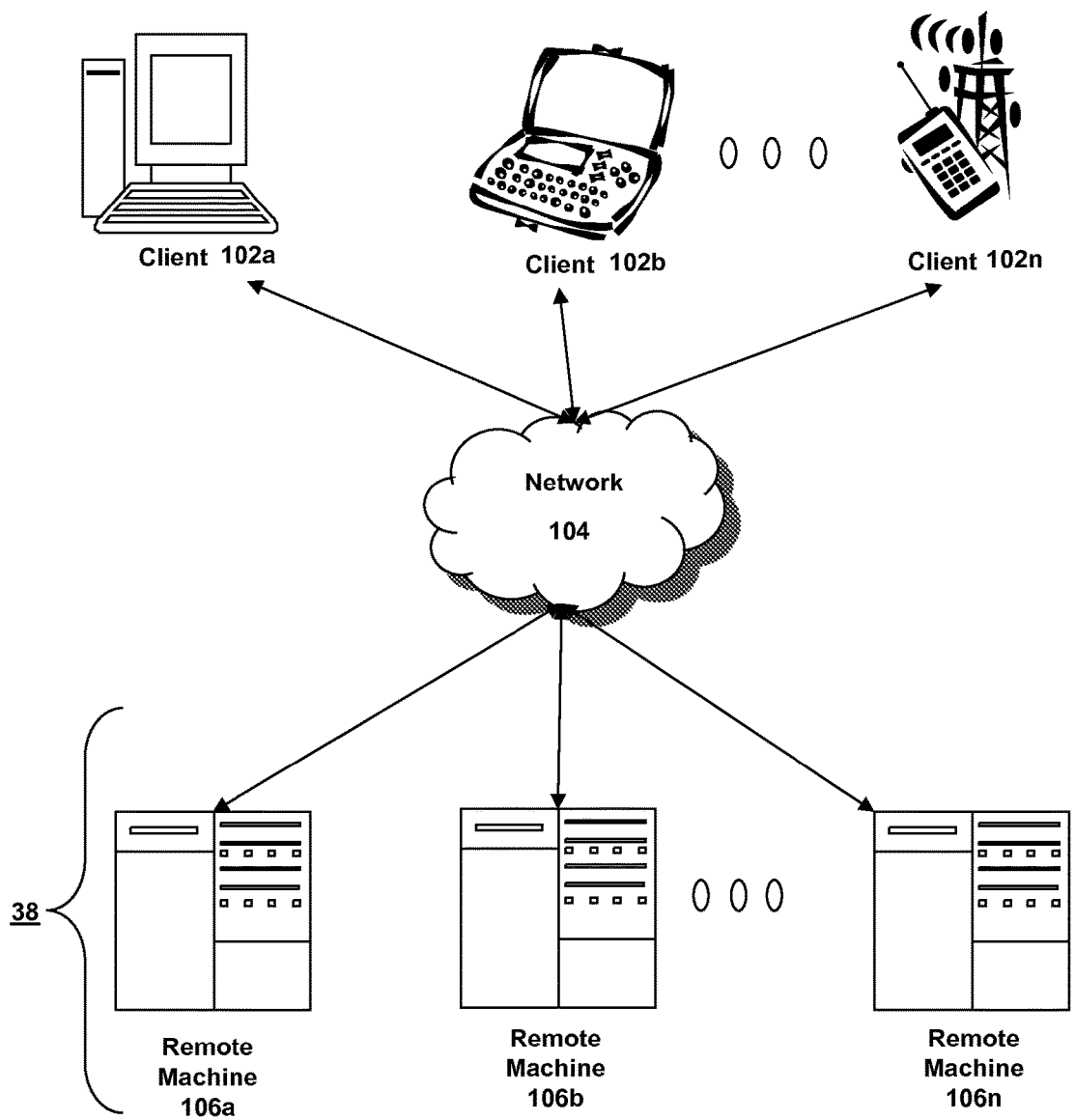
FIG. 1A-1C are block diagrams depicting embodiments of computers useful in connection with the methods and systems described herein.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, endpoint(s) 102, or endpoint node(s) 102) in communication with one or more remote machines 106a-106n (also generally referred to as server(s) 106 or computing device(s) 106) via one or more networks 104.

Although FIG. 1A shows a network 104 between the clients 102 and the remote machines 106, the clients 102 and the remote machines 106 may be on the same network 104. The network 104 can be a local area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS, or UMTS. In some embodiments, different types of data may be transmitted via different protocols. In other embodiments, the same types of data may be transmitted via different protocols.

A client 102 and a remote machine 106 (referred to generally as computing devices 100) can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 102 may execute, operate or otherwise provide an application, which can be any type and/or form of software, program, or executable instructions, including, without limitation, any type and/or form of web browser, web-based client, client-server application, an ActiveX control, or a Java applet, or any other type and/or form of executable instructions capable of executing on client 102.

In one embodiment, a computing device 106 provides functionality of a web server. In some embodiments, a web server 106 comprises an open-source web server, such as the APACHE servers maintained by the Apache Software Foundation of Delaware. In other embodiments, the web server executes proprietary software, such as the Internet Information Services products provided by Microsoft Corporation of Redmond, Wash., the Oracle iPlanet web server products provided by Oracle Corporation of Redwood Shores, Calif., or the BEA WEBLOGIC products provided by BEA Systems of Santa Clara, Calif. In further embodiments, a computing device 106 executes self-replication software. In one of these embodiments, execution of the self-replication software allows a computing device 106a to direct a second computing device 106b to provide a copy of data stored by the computing device 106. For example, the computing device 106a may provide access to a web site and, upon execution of the self-replication software, direct the second computing device 106b to provide access to a copy of the web site.

In some embodiments, the system may include multiple, logically-grouped remote machines 106. In one of these embodiments, the logical group of remote machines may be referred to as a server farm 38. In another of these embodiments, the server farm 38 may be administered as a single entity.

Figure 1B:
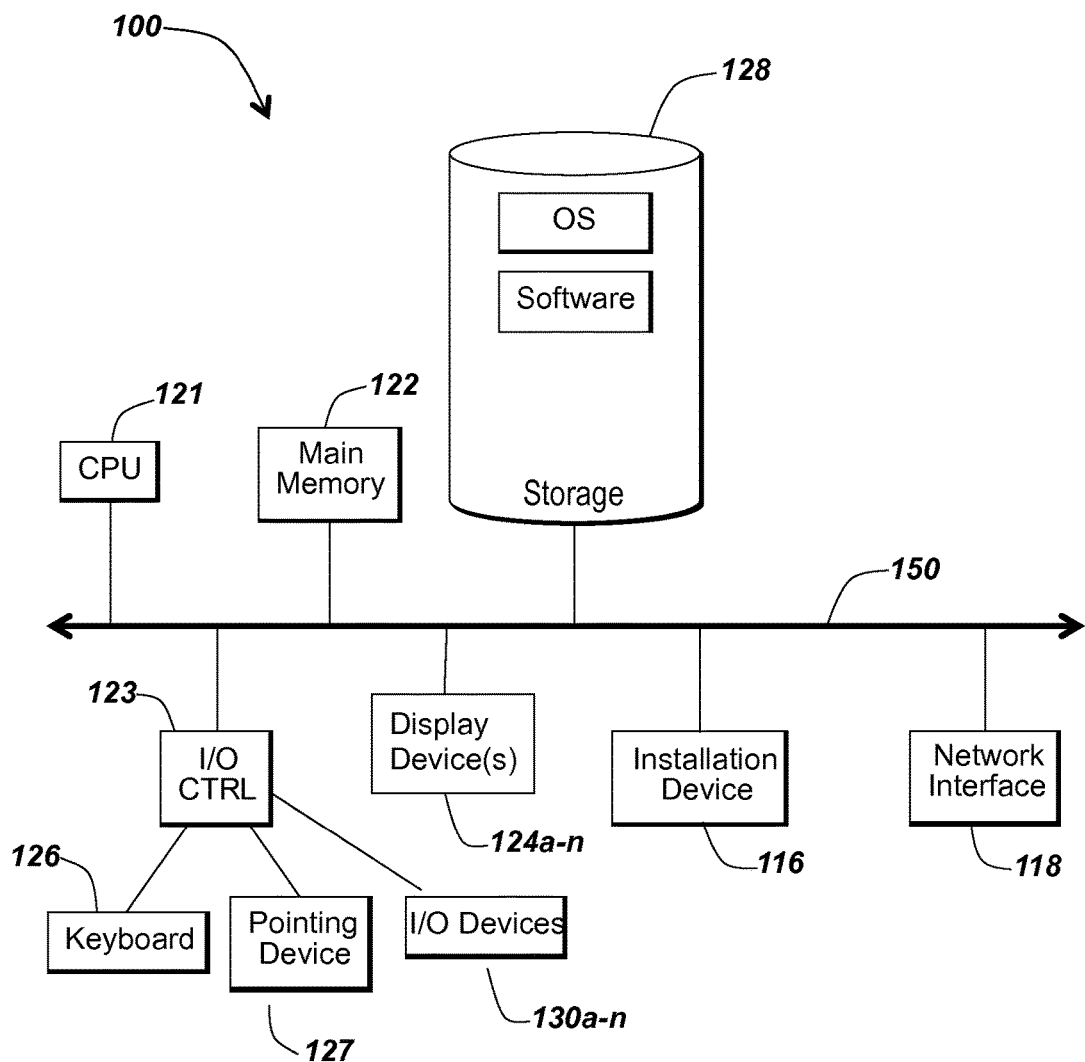
Figure 1C:
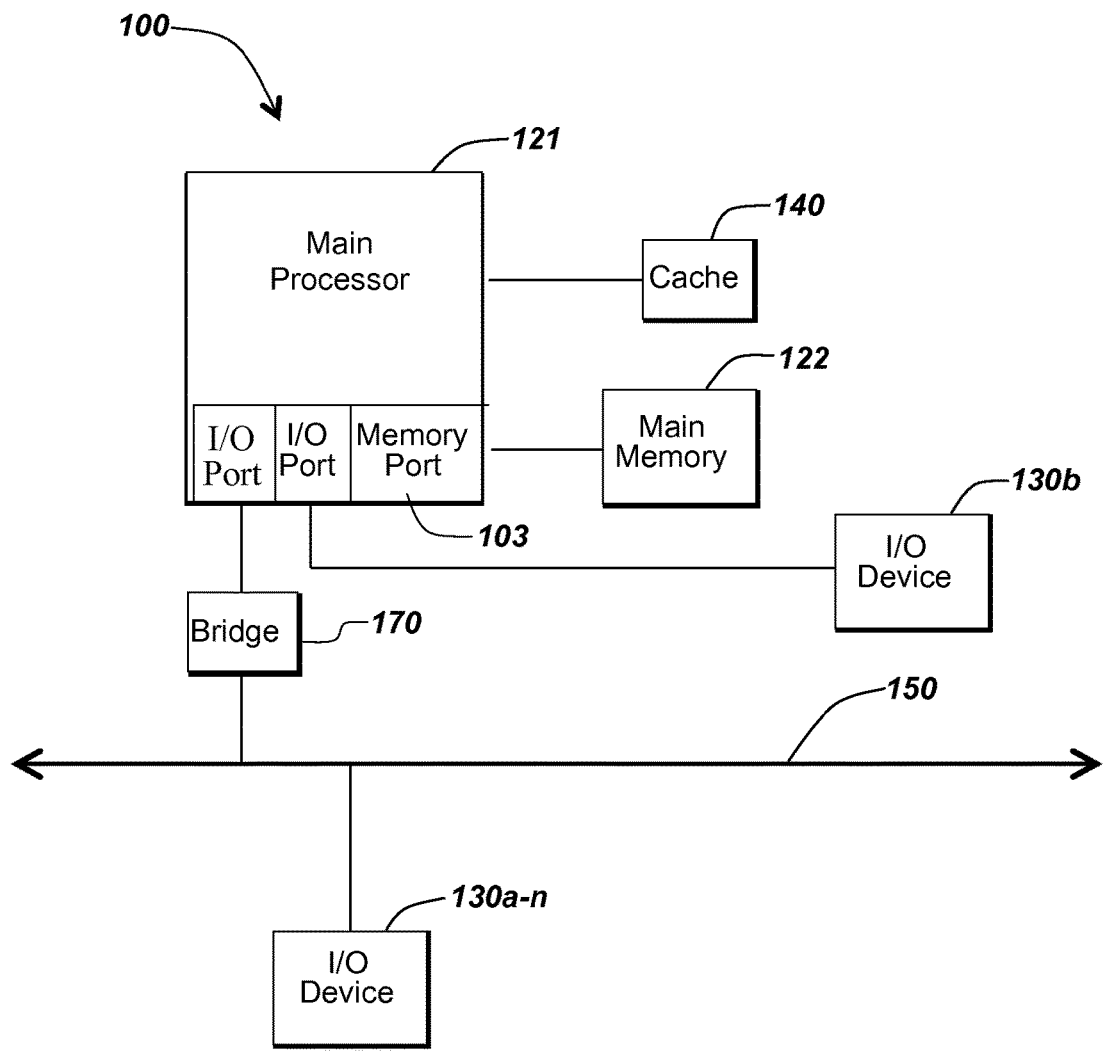

FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126, a pointing device 127, such as a mouse, and one or more other I/O devices 130a-n. The storage device 128 may include, without limitation, an operating system and software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121. The main memory 122 may be based on any available memory chips capable of operating as described herein. In the embodiment shown in FIG. 1B, the processor 121 communicates with main memory 122 via a system bus 150. FIG. 1C depicts an embodiment of a computing device 100 in which the processor communicates directly with main memory 122 via a memory port 103. FIG. 1C also depicts an embodiment in which the main processor 121 communicates directly with cache memory 140 via a secondary bus, sometimes referred to as a backside bus. In other embodiments, the main processor 121 communicates with cache memory 140 using the system bus 150.

In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 also communicates directly with an I/O device 130b via, for example, HYPERTRANSPORT, RAPIDIO, or INFINIBAND communications technology.

A wide variety of I/O devices 130a-130n may be present in the computing device 100. Input devices include keyboards, mice, trackpads, trackballs, microphones, scanners, cameras, and drawing tablets. Output devices include video displays, speakers, inkjet printers, laser printers, and dye-sublimation printers. The I/O devices may be controlled by an I/O controller 123 as shown in FIG. 1B. Furthermore, an I/O device may also provide storage and/or an installation medium 116 for the computing device 100. In some embodiments, the computing device 100 may provide USB connections (not shown) to receive handheld USB storage devices such as the USB Flash Drive line of devices manufactured by Twintech Industry, Inc. of Los Alamitos, Calif.

Referring still to FIG. 1B, the computing device 100 may support any suitable installation device 116, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. The computing device 100 may further comprise a storage device, such as one or more hard disk drives or redundant arrays of independent disks, for storing an operating system and other software.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax, and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem, or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, and WINDOWS VISTA, all of which are manufactured by Microsoft Corporation of Redmond, Wash.; MAC OS manufactured by Apple Inc. of Cupertino, Calif.; OS/2 manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. In other embodiments the computing device 100 is a mobile device, such as a JAVA-enabled cellular telephone or personal digital assistant (PDA). The computing device 100 may be a mobile device such as those manufactured, by way of example and without limitation, by Motorola Corp. of Schaumburg, Ill.; Kyocera of Kyoto, Japan; Samsung Electronics Co., Ltd. of Seoul, Korea; Nokia of Finland; Hewlett-Packard Development Company, L.P. and/or Palm, Inc., of Sunnyvale, Calif.; Sony Ericsson Mobile Communications AB of Lund, Sweden; or Research In Motion Limited of Waterloo, Ontario, Canada. In yet other embodiments, the computing device 100 is a smart phone, Pocket PC, Pocket PC Phone, or other portable mobile device supporting Microsoft Windows Mobile Software.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices manufactured by Apple Inc. of Cupertino, Calif. In another of these embodiments, the digital audio player may function as both a portable media player and as a mass storage device. In other embodiments, the computing device 100 is a digital audio player such as those manufactured by, for example, and without limitation, Samsung Electronics America of Ridgefield Park, N.J., Motorola Inc. of Schaumburg, Ill., or Creative Technologies Ltd. of Singapore. In yet other embodiments, the computing device 100 is a portable media player or digital audio player supporting file formats including, but not limited to, MP3, WAV, M4A/AAC, WMA Protected AAC, AEFF, Audible audiobook, Apple Lossless audio file formats, and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a device in the Motorola line of combination digital audio players and mobile phones. In another of these embodiments, the computing device 100 is a device in the iPhone smartphone line of devices manufactured by Apple Inc. of Cupertino, Calif. In still another of these embodiments, the computing device 100 is a device executing the Android open source mobile phone platform distributed by the Open Handset Alliance; for example, the device 100 may be a device such as those provided by Samsung Electronics of Seoul, Korea, or HTC Headquarters of Taiwan, R.O.C. In other embodiments, the computing device 100 is a tablet device such as, for example and without limitation, the iPad line of devices manufactured by Apple Inc.; the PlayBook manufactured by Research In Motion; the Cruz line of devices manufactured by Velocity Micro, Inc. of Richmond, Va.; the Folio and Thrive line of devices manufactured by Toshiba America Information Systems, Inc. of Irvine, Calif.: the Galaxy line of devices manufactured by Samsung; the HP Slate line of devices manufactured by Hewlett-Packard; and the Streak line of devices manufactured by Dell, Inc. of Round Rock, Tex.

Figure 1D:
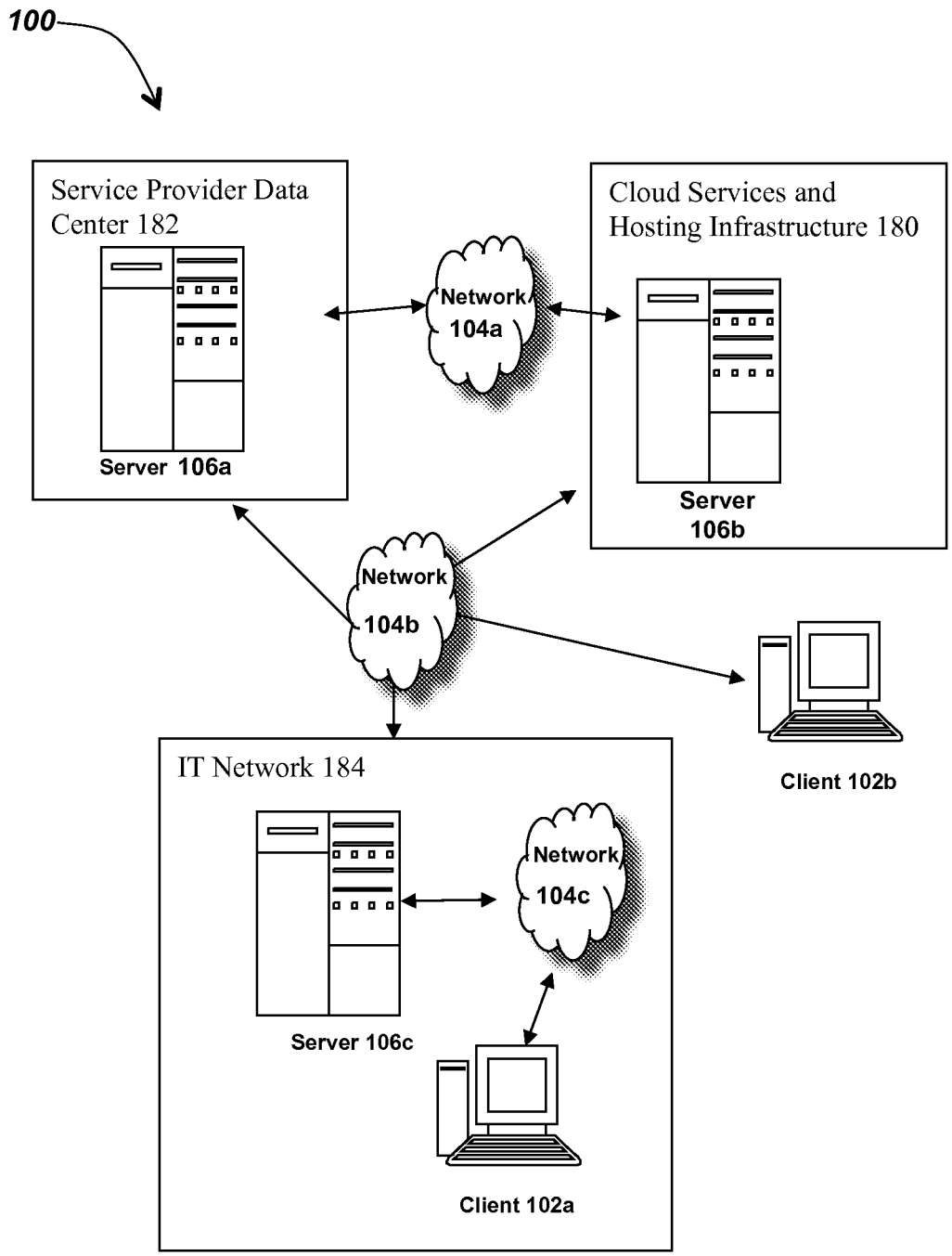
FIG. 1D is a block diagram depicting one embodiment of a system in which a plurality of networks provide data hosting and delivery services.

Referring now to FIG. 1D, a block diagram depicts one embodiment of a system in which a plurality of networks provide hosting and delivery services. In brief overview, the system includes a cloud services and hosting infrastructure 180, a service provider data center 182, and an information technology (IT) network 184.

In one embodiment, the data center 182 includes computing devices such as, without limitation, servers (including, for example, application servers, file servers, databases, and backup servers), routers, switches, and telecommunications equipment. In another embodiment, the cloud services and hosting infrastructure 180 provides access to, without limitation, storage systems, databases, application servers, desktop servers, directory services, web servers, as well as services for accessing remotely located hardware and software platforms. In still other embodiments, the cloud services and hosting infrastructure 180 includes a data center 182. In other embodiments, however, the cloud services and hosting infrastructure 180 relies on services provided by a third-party data center 182. In some embodiments, the IT network 104c may provide local services, such as mail services and web services. In other embodiments, the IT network 104c may provide local versions of remotely located services, such as locally-cached versions of remotely-located print servers, databases, application servers, desktop servers, directory services, and web servers. In further embodiments, additional servers may reside in the cloud services and hosting infrastructure 180, the data center 182, or other networks altogether, such as those provided by third-party service providers including, without limitation, infrastructure service providers, application service providers, platform service providers, tools service providers, and desktop service providers.

In one embodiment, a user of a client 102 accesses services provided by a remotely located server 106a. For instance, an administrator of an enterprise IT network 184 may determine that a user of the client 102a will access an application executing on a virtual machine executing on a remote server 106a. As another example, an individual user of a client 102b may use a resource provided to consumers by the remotely located server 106 (such as email, fax, voice or other communications service, data backup services, or other service).

As depicted in FIG. 1D, the data center 182 and the cloud services and hosting infrastructure 180 are remotely located from an individual or organization supported by the data center 182 and the cloud services and hosting infrastructure 180; for example, the data center 182 may reside on a first network 104a and the cloud services and hosting infrastructure 180 may reside on a second network 104b, while the IT network 184 is a separate, third network 104c. In other embodiments, the data center 182 and the cloud services and hosting infrastructure 180 reside on a first network 104a and the IT network 184 is a separate, second network 104c. In still other embodiments, the cloud services and hosting infrastructure 180 resides on a first network 104a while the data center 182 and the IT network 184 form a second network 104c. Although FIG. 1D depicts only one sever 106a, one server 106b, one server 106c, two clients 102, and three networks 104, it should be understood that the system may provide multiple ones of any or each of those components. The servers 106, clients 102, and networks 104 may be provided as described above in connection with FIGS. 1A-1C.

Therefore, in some embodiments, an IT infrastructure may extend from a first network—such as a network owned and managed by an individual or an enterprise—into a second network, which may be owned or managed by a separate entity than the entity owning or managing the first network. Resources provided by the second network may be said to be "in a cloud." Cloud-resident elements may include, without limitation, storage devices, servers, databases, computing environments (including virtual machines, servers, and desktops), and applications. For example, the IT network 184 may use a remotely located data center 182 to store servers (including, for example, application servers, file servers, databases, and backup servers), routers, switches, and telecommunications equipment. The data center 182 may be owned and managed by the IT network 184 or a third-party service provider (including for example, a cloud services and hosting infrastructure provider) may provide access to a separate data center 182.

In some embodiments, one or more networks providing computing infrastructure on behalf of customers is referred to a cloud. In one of these embodiments, a system in which users of a first network access at least a second network including a pool of abstracted, scalable, and managed computing resources capable of hosting resources may be referred to as a cloud computing environment. In another of these embodiments, resources may include, without limitation, virtualization technology, data center resources, applications, and management tools. In some embodiments, Internet-based applications (which may be provided via a "software-as-a-service" model) may be referred to as cloud-based resources. In other embodiments, networks that provide users with computing resources, such as remote servers, virtual machines, or blades on blade servers, may be referred to as compute clouds or "infrastructure-as-a-service" providers. In still other embodiments, networks that provide storage resources, such as storage area networks, may be referred to as storage clouds. In further embodiments, a resource may be cached in a local network and stored in a cloud.

In some embodiments, some or all of a plurality of remote machines 106 may be leased or rented from third-party companies such as, by way of example and without limitation, Amazon Web Services LLC of Seattle, Wash.; Rackspace US, Inc. of San Antonio, Tex.; Microsoft Corporation of Redmond, Wash.; and Google Inc. of Mountain View, Calif. In other embodiments, all the hosts 106 are owned and managed by third-party companies including, without limitation, Amazon Web Services LLC, Rackspace US, Inc., Microsoft, and Google.

In some embodiments, the methods and systems described herein provide functionality for dynamically provisioning resources for on-demand courses. In one of these embodiments, the methods and systems described herein provide functionality allowing software and systems companies to reduce training costs and increase revenue while expanding their reach and influence with the technical communities they serve. In another of these embodiments, the methods and systems described herein provide software and services that allow information technology (IT) professionals to create, run, take, and share "hands-on" training labs that provide valuable systems and application software knowledge by using on-line, low cost, on-demand, user configurable, and highly scalable data center resources; such end-to-end resources may include a high performing, secure environment isolated from corporate networks. In other embodiments, the methods and systems described herein reduce the need for software and services companies to acquire hardware and software resources and make those resources available in physical classrooms in order to provide hands-on enterprise software training, without requiring these companies to extend their own management and configuration capabilities to allow for remote control of data center service provider infrastructure. In one of these embodiments, by way of example, such companies need not create an end-to-end IT-as-a-service solution in order to provide on-demand, user-configurable, hands-on technical training.

Figure 2:
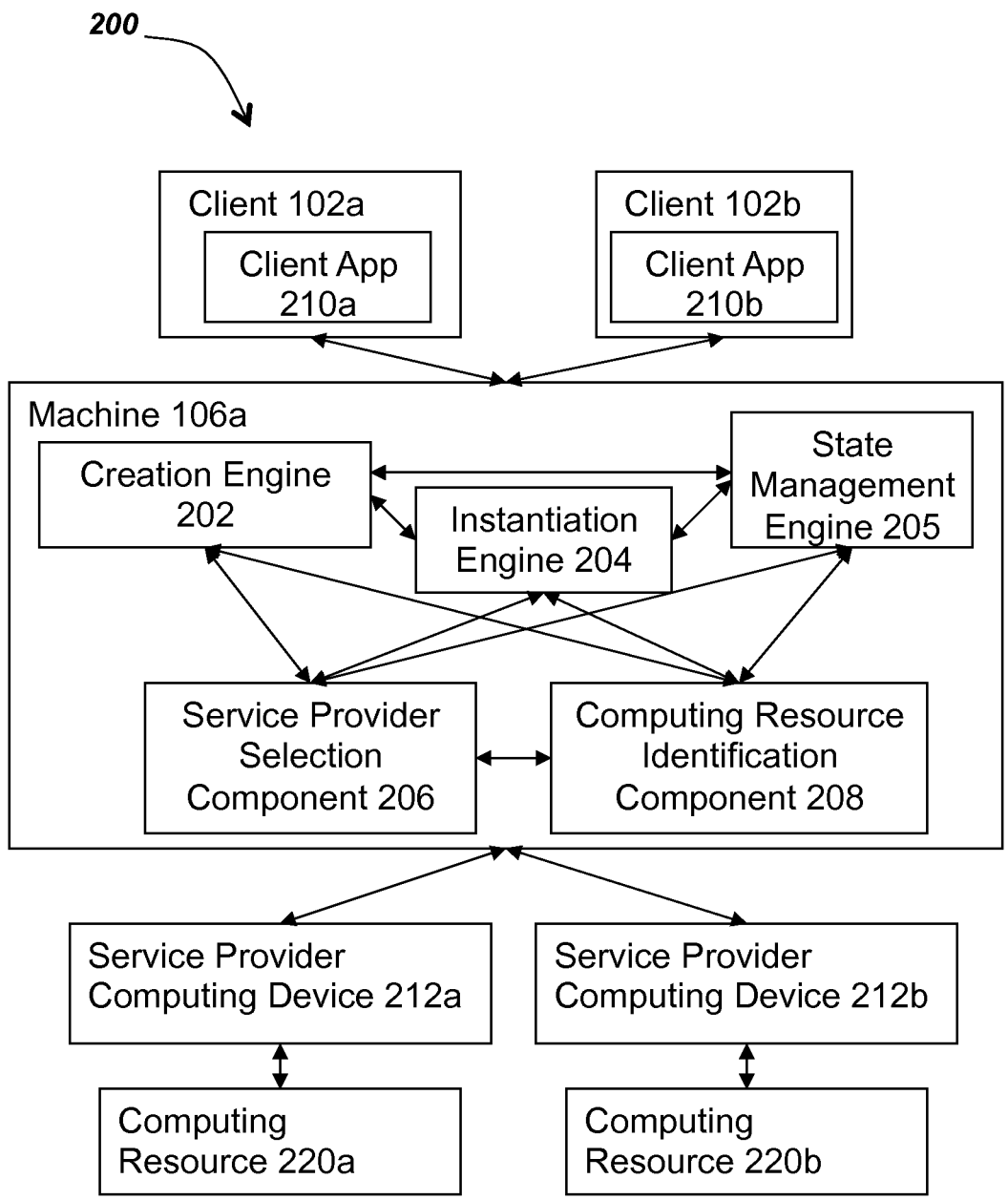
FIG. 2 is a block diagram depicting an embodiment of a system for creating and providing access to a course incorporating dynamically provisioned resources.

Referring now to FIG. 2, a block diagram depicts one embodiment of a system for creating and providing access to a course incorporating dynamically provisioned resources, including functionality for dynamically provisioning the resources for an on-demand course. In brief overview, the system includes a creation engine 202, an instantiation engine 204, a state management engine 205, a service provider selection component 206, a computing resource identification component 208, a client 102a-n, a client application 210a-n, a machine 106a, a plurality of service providers 212a-n, and a plurality of computing resources 220a-n. In some embodiments, the creation engine 202 and instantiation engine 204 provide functionality for rapidly creating, deploying and managing courses (such as hands-on training labs) on-demand from remote locations.

In one embodiment, the machine 106a executes the creation engine 202 and the instantiation engine 204. In another embodiment, the creation engine 202 provides an interface to the client 102a with which a user of the client 102a may create applications. In still another embodiment, the instantiation engine 204 provides a second interface with which clients (e.g., the client 102a or a second client 102b) may access previously created applications. In yet another embodiment, the creation engine 202 communicates with the instantiation engine 204 to provision hardware and software resources for use in creating an application. Applications may include, without limitation, courses, portions of courses, and course-related software (including software hosted by a third party and made available over the network 104) and hardware, each of which may be generally referred to herein as "courses."

In some embodiments, the machine 106a executes the service provider selection component 206. In one of these embodiments, the creation engine 202 interacts with the service provider selection component 206 to identify one of a plurality of service provider computing devices 212a-n with which to provide access to resources for use during a course. In another of these embodiments, the creation engine 202 includes the functionality of the service provider selection component 206. In another of these embodiments, the creation engine 202 communicates with the instantiation engine 204 to identify service provider computing devices 212 and provision computing resources 220. In still another of these embodiments, the instantiation engine 204 interacts with the service provider selection component 206 to identify one of a plurality of service provider computing devices 212a-n with which to provide access to resources for use during a course. In yet another of these embodiments, the instantiation engine 204 includes the functionality of the service provider selection component 206.

In some embodiments, the machine 106a executes the computing resource identification component 208. In one of these embodiments, the creation engine 202 interacts with the computing resource identification component 208 to identify a type of computing resource for use during a course. In another of these embodiments, the creation engine 202 includes the functionality of the computing resource identification component 208. In another of these embodiments, the creation engine 202 communicates with the instantiation engine 204 to identify types of computing resources for use during a course. In still another of these embodiments, the instantiation engine 204 interacts with the computing resource identification component 208 to identify a type of computing resource for use during a course. In yet another of these embodiments, the instantiation engine 204 includes the functionality of the computing resource identification component 208.

In some embodiments, the instantiation engine 204 includes an execution engine (not shown) with which it executes a course. In other embodiments, the computing resources 220 include one or more execution engines with which to execute a course. For example, and without limitation, to provide a client app 210 with access to a course, a resource executes; the resource may be software or hardware, the resource may be virtualized, the resource may be software executed on a second machine 106b and accessed across the network 104 via a computing resource 220 (e.g., third party software provided as "software-as-a-service"), and the resource may execute on either the instantiation engine 204, the computing resource 220, or both with a first sub-component of the resource executing on the instantiation engine 204 and a second sub-component of the resource executing on the computing resource 220.

In one embodiment, the system 200 includes a recommendation engine (not shown), which generates a recommendation that a user take a course. For example, the recommendation engine may review data associated with the user to determine what courses the user has previously taken and generate a recommendation of additional courses that the user should take. Continuing with this example, the recommendation engine may analyze data associated with other users who took the same courses as the user to determine what other courses they took and recommends those courses to the user. As another example, the recommendation engine may analyze data associated with the user including, by way of example and without limitation, type of job, place of employment, career-related interests, other career-related data, course review data (indicating a preference for a type of course or professor), and other profile data and compare that data with other users who have similar profiles to identify courses to recommend to the user. Additionally, the recommendation engine may analyze metadata associated with a user in making the recommendation; for example, the recommendation engine may analyze metadata identifying other courses taken by the user, an amount of time spent by the user taking courses generally, an amount of time spent by the user on a specific course, and other usage metrics.

In some embodiments, the system 200 includes a playback engine (not shown), which allows a user to view a recorded version of a course. In one of these embodiments, a first user takes a course, records the audio or video course data, saves the recorded data to the system 200 (e.g., to the state management engine 205), and shares the recorded course data (e.g., by posting a link to the recorded data on a blog, micro-blog, video-sharing, or other web site). In another of these embodiments, a second user connects to a playback engine executing on the machine 106 and the playback engine plays, directly or indirectly, the recorded video for the user.

In one embodiment, providers of the machine 106a also provide the plurality of service provider computing devices 212a-n. For example, an administrator of a system for dynamically provisioning resources for on-demand courses may also administer computing devices with which to provide access to remote resources. However, in other embodiments, a third party owns, maintains or provides access to the service provider computing devices 212a-n, and the computing resources 220a and 220b.

In one embodiment, the state management engine 205 includes functionality for communicating with the service provider computing devices 212a-n. In one embodiment, the state management engine 205 includes functionality for communicating with the computing resources 220a-n. In another embodiment, the state management engine 205 maintains, directly or indirectly, a state of a course for one or more users; for example, the state management engine 205 may instruct a computing resource 220a to save a state of a course generated by a client app 210a in communication with the creation engine 202 while in another example, the state management engine 205 receives, from at least one of the service provider computing device 212 and the computing resource 220, a state snapshot of a course at a point where a student has paused his interaction with the computing resource 220. State snapshots and virtual machine images and other data structures for preserving state data may be provided in any type, format, or structure, as will be understood by one of ordinary skill in the art.

In some embodiments, the state management engine 205 manages the state of data associated with a course. In one of these embodiments, the state management engine 205 manages social media data associated with a course. For example, the state management engine 205 may determine that a social networking site includes data describing the course (e.g., a student who took the course may have put a review of the course in a micro-blogging site such as the site provided by Twitter, Inc. of San Francisco, Calif., or a creator of the course may have put a video file displaying an execution of the course on a video sharing site, such as the site provided by YouTube LLC of San Bruno, Calif.). In this example, the state management engine 205 may include a link to the associated data in the metadata stored with the course or otherwise make the associated data available.

Computing resources 220a-n include, without limitation, physical or virtualized computing components that users of remote machines may access over a network 104. For example, and without limitation, the computing resources 220a-n may include computers 100 as described above in connection with FIGS. 1A-1D. By way of further example, the computing resources 220a-n may include virtual computers, virtual computer components (such as hard drives), physical computers (including, by way of example, blades on blade servers or other types of shared or dedicated servers), memory, network devices, databases, or software. In other embodiments, the computing resources 220a-n act as intermediaries and provide access to other remote machines. For example, a computing resource 220a (maintained either by a provider of the machine 106 or by a third party) may provide access to a second machine 106b that executes software made available over the network 104; by way of example, a software-as-a-service provider may execute software on a second machine 106b that a user can access via the computing resource 220a while taking a course. Although referred to herein as engines and components, the creation engine 202, the instantiation engine 204, the state machine engine 205, the service provider selection component 206, and the computing resource identification component 208 may each be provided as either hardware or software and may execute on one or more machines 100 as described above in FIGS. 1A-1D.

Figure 3A:
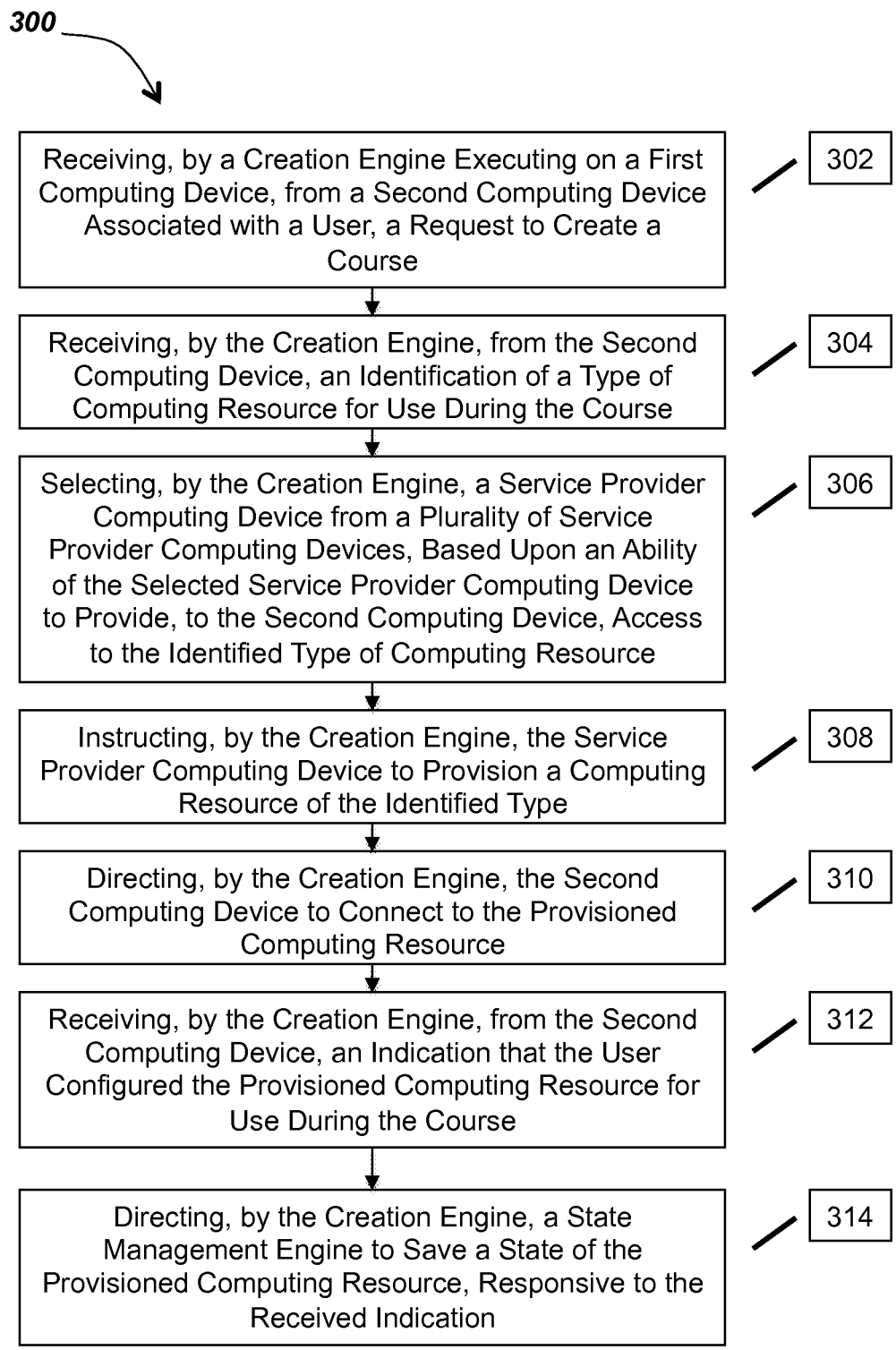
FIG. 3A is a flow diagram depicting an embodiment of a method for creating a course incorporating dynamically provisioned resources.

Referring now to FIG. 3A, a flow diagram depicts one embodiment of a method 300 for dynamically provisioning resources for on-demand courses. In brief overview, the method 300 includes receiving, by a creation engine executing on a first computing device, from a second computing device associated with a user, a request to create a course (302). The method 300 includes receiving, by the creation engine, from the second computing device, an identification of a type of computing resource for use during the course (304). The method 300 includes selecting, by the creation engine, a service provider computing device from a plurality of service provider computing devices, based upon an ability of the selected service provider computing device to provide, to the second computing device, access to the identified type of computing resource (306). The method 300 includes instructing, by the creation engine, the service provider computing device to provision a computing resource of the identified type (308). The method 300 includes directing, by the creation engine, the second computing device to connect to the provisioned computing resource (310). The method 300 includes receiving, by the creation engine, from the second computing device, an indication that the user configured the provisioned computing resource for use during the course (312). The method 300 includes directing, by the creation engine, a state management engine to save a state of the provisioned computing resource, responsive to the received indication (314).

Referring now to FIG. 3 in greater detail, and in connection with FIG. 2, a creation engine executing on a first computing device receives, from a second computing device associated with a user, a request to create a course (302). In one embodiment, the creation engine 202 provides, to the client 102a, a user interface with which the user may provide data associated with the course. In another embodiment, the creation engine 202 transmits, to the client 102a, a client application 210a with which the user may provide data associated with the course. In still another embodiment, the client application 210a is a commercially available web browser with which the user establishes a connection to the creation engine 202.

In some embodiments, the creation engine 202 provides the client 102a with automated tools for creating a hands-on training environment. In one of these embodiments, the creation engine 202 provides functionality for receiving requests from a content creator (e.g., the user of the client 102a) regarding hardware and software resources and data to provide as part of a course, and the creation engine 202 identifies and provisions requested resources without requiring the content creator to physically acquire, travel to, and configure the requested resources.

In one embodiment, the course is an on-line course. In another embodiment, the course provides at least one training exercise. In still another embodiment, the course includes at least one hands-on laboratory exercise (which may also be referred to as training labs, lab exercises, and hands-on labs). By way of example, and without limitation, the course may include an exercise in which a student taking the course interacts with virtualized hardware or virtualized software to practice a skill taught in the course; for example, the course may be a hands-on training lab in which the student taking the course learns how to configure a particular type of hardware and the exercise allows the student to practice configuring the particular type of hardware by interacting with a virtualized version of the hardware. In such an example, the student is able to take the course on-line, on-demand, without needing to travel to a site that has the hardware available for practicing on, and is able to interact with an actual version of the hardware instead of being limited to watching a video about how to configure the hardware, reading about how to configure the hardware, or attempting to understand how to configure the hardware in the abstract.

In one example, the course offers training on a piece of software that is typically offered as software-as-a-service (e.g., web-based software). In this example, the course uses a computing resource 220a to access a computing device maintained by a third-party software-as-a-service provider; provisioning the computing resource 220a may include establishing a user account with the third-party provider so that when a student takes the course the user account is already available. In some embodiments, the instantiation engine 204 provides functionality for managing such user accounts, allocating accounts, pre-populating accounts with data for use in the course, un-allocating accounts, and preparing the accounts for re-use by other users of the course.

As another example, the course may include an exercise in which a student taking the course interacts with virtualized software to practice a skill taught in the course; for example, the course may be a hands-on training lab in which the student taking the course learns how to use a particular software application. In such an example, the student is able to use the software application without either the student or an instructor having to set up a physical machine on which to install the software, without having to go through the installation process, and without having to maintain the hardware and software needed to perform the exercise for multiple students over time.

The creation engine receives, from the second computing device, an identification of a type of computing resource for use during the course (304). In one embodiment, the creation engine 202 receives from the client 102a an identification of a type of hardware for use during the course. By way of example, if the user is creating a course on configuring a type of network device (e.g., a router, a switch, or a hardware firewall), the user specifies the type of network device. In another embodiment, the creation engine 202 receives, from the client 102a, an identification of a type of software for use during the course. For example, if the user is creating a course on configuring a type of operating system or managing a database, the creation engine 202 receives, from the client 102a, an identification of the type of operating system or database.

In one embodiment, the creation engine 202 receives a plurality of identifications of types of computing resources. For example, the user creating the course may specify that a variety of types of hardware and software will be used in completing the course. In another embodiment, the creation engine 202 receives an identification of a type of computing resource with which to execute the course; for example, and without limitation, in addition to indicating that students of the course will access particular types of networking devices on which to practice skills learned while taking the course, the course itself may be offered for execution by, for example, a WINDOWS operating system or an APPLE MACINTOSH operating system.

In one embodiment, upon receiving the identification of the type of computing resource, the creation engine 202 identifies one or more service providers that provide access to that type of computing resource and arranges to have the one or more service providers provide access to the type of computing resource. In another embodiment, the creation engine 202 configures a computing resource of the identified type on behalf of the user of the client 102a. In still another embodiment, the creation engine 202 provides the client 102a with access to a provisioned computing resource of the identified type; for example, the creation engine 202 may provide the client 102a with access to the provisioned computing resource so that the user of the client 102a may further configure the resource for use during the course. In yet another embodiment, by selecting and provisioning a computing resource of the identified type, the creation engine 202 reduces the burden on a creator of a course since the creator need not physically acquire the resource, configure it for use during the class and make it available during playback.

The creation engine selects a service provider computing device from a plurality of service provider computing devices based upon an ability of the selected service provider computing device to provide, to the second computing device, access to the identified type of computing resource (306). In one embodiment, the creation engine 202 selects one of the plurality of service provider computing devices 212a-n from which to provision a computing resource 220a-n having the identified type. In some embodiments, the creation engine 202 identifies a plurality of service provider computing devices 212 that have the ability to provide access to the identified type of computing resource. In one of these embodiments, the creation engine 202 selects one of the identified plurality of service provider computing devices 212 that provides access to the identified type of computing resource at a lower price than a second of the plurality of service provider computing devices 212.

The creation engine instructs the service provider computing device to provision a computing resource of the identified type (308). In one embodiment, the creation engine 202 instructs the service provider computing device 212a to provision the computing resource 220a so that the creator of the course (i.e., the user of the client 102a) may further configure the computing resource 220a as part of creating the course. In one embodiment, the creation engine 202 executes an application programming interface (API) command to provision the computing resource 220a-n. In other embodiments, the instantiation engine 204 receives a request from the creation engine 202 to provision the computing resource 220a. In one of these embodiments, the instantiation engine 204 instructs the service provider computing device 212a to provision the computing resource 220a so that the creator of the course (i.e., the user of the client 102a) may further configure the computing resource 220a as part of creating the course.

In some embodiments, the creation engine 202 arranges to have a computing resource 220a of the identified type available for provisioning during a certain period of time. In one of these embodiments, the creation engine 202 arranges to buy, rent or lease the computing resource 220a for a period of time so that the computing resource 220a is available when a student (e.g., a user of the client 102b) wants to take the course. In other embodiments, the creation engine 202 arranges to have the service provider 212 commit to maintaining a plurality of computing resources 220a-n available for use by any client 102b. In further embodiments, the creation engine 202 arranges to provision a computing resource 220a only during the period of time during which a user of the client 102a or client 102b requests access to the computing resource 220a. In some embodiments, the instantiation engine 204 provides the functionality for arranging to have the computing resource 220a of the identified type available for provisioning during a certain period of time.

The creation engine directs the second computing device to connect to the provisioned computing resource (310). In one embodiment, the client 102a connects directly to the provisioned computing resource 220a. In another embodiment, the client 102a connects first to the service provider computing device 212a and then connects to the computing resource 220a. In still another embodiment, the creation engine 202 connects to the computing resource 220a and forwards data received from the client 102a to the computing resource 220a.

In one embodiment, the user of the client 102a configures the provisioned computing resource for use in the course; for example, the user of the client 102a may install software on the provisioned computing resource. As another example, where the provisioned computing resource will be used to complete an exercise as part of the course, the user of the client 102a may actually disable it, turn off functionality, or otherwise take an action to leave the provisioned computing resource 220a less functional than it would otherwise have been—for example, if the exercise is to debug code written in a programming language the student is learning, the course creator may introduce an error into sample code stored by the provisioned computing resource 220a; if the exercise is to learn how to fix a common problem when setting up a type of hardware device, the course creator may introduce the problem into the provisioned computing resource 220a. As discussed above, in some embodiments, the provisioned computing resource 220a is the machine on which a student will execute the course itself (e.g., a remotely hosted server or virtual machine) and in other embodiments, the provisioned computing resource 220a is an additional resource with which a student will complete an exercise as part of the course (e.g., hardware to configure, software to install, or a platform from which the student may write computer applications). Therefore, in some embodiments, the user configuring the provisioned computing resource 220 may be installing software, adding data (such as course materials) or otherwise customizing the software from which the course will execute, while in other embodiments, the user configuring the provisioned computing resource 220 may be customizing hardware or software resources that are complementary to the course. In other embodiments, however, the course uses a default configuration available upon provisioning of the computing resource 220a and no further configuration is required.

The creation engine receives, from the second computing device, an indication that the user configured the provisioned computing resource for use during the course (312). In one embodiment, the creation engine 202 receives the indication from the client application 210a. In another embodiment, the creation engine 202 receives the indication from the computing resource 220a. In still another embodiment, the creation engine 202 receives the indication from the service provider computing device 212a. In some embodiments, the instantiation engine 204 receives, from the second computing device, an indication that the user configured the provisioned computing resource for use during the course. In other embodiments, the instantiation engine 204 receives, from the creation engine 202, an indication that the user configured the provisioned computing resource for use during the course.

The creation engine directs a state management engine to save a state of the provisioned computing resource, responsive to the received indication (314). In some embodiments, the creation engine 202 directs the state management engine 205 to store a snapshot image of the provisioned computing resource 220a. In other embodiments, the creation engine 202 directly accesses the computing resource 220a and generates a snapshot image of the computing resource 220a. In one embodiment, the creation engine 202 directs the state management engine 205 to store the state in a database accessible to the creation engine 202. In another embodiment, the creation engine 202 instructs the state management engine 205 to provide the state to the creation engine 202 for storage local to the machine 106. In other embodiments, the state management engine 205 receives the instruction to store the snapshot image of the provisioned computing resource 220a from the instantiation engine 204. In further embodiments, the state management engine 205 automatically saves the state of the computing resource 220a without requiring direction from the creation engine 202 or the instantiation engine 204.

In some embodiments, the service provider computing device 212 stores the saved state. In one of these embodiments, the creation engine 202 directs the service provider computing device 212 to store the saved state. In other embodiments, a provisioned computing resource 220 stores the saved state. In one of these embodiments, the creation engine 202 directs the provisioned computing resource 220 to store the saved state.

In one embodiment, the creation engine 202 receives course data from the client 102a, which may include, by way of example and without limitation, course materials, reference materials, exercises, hands-on training guides, and presentation materials. In another embodiment, the creation engine 202 receives from the client 102a one or more identifications of types of computing resources and stores the one or more identifications with the course data. For example, the creation engine 202 may generate a document enumerating one or more identifications and associate the document with the course data.

Figure 3B:
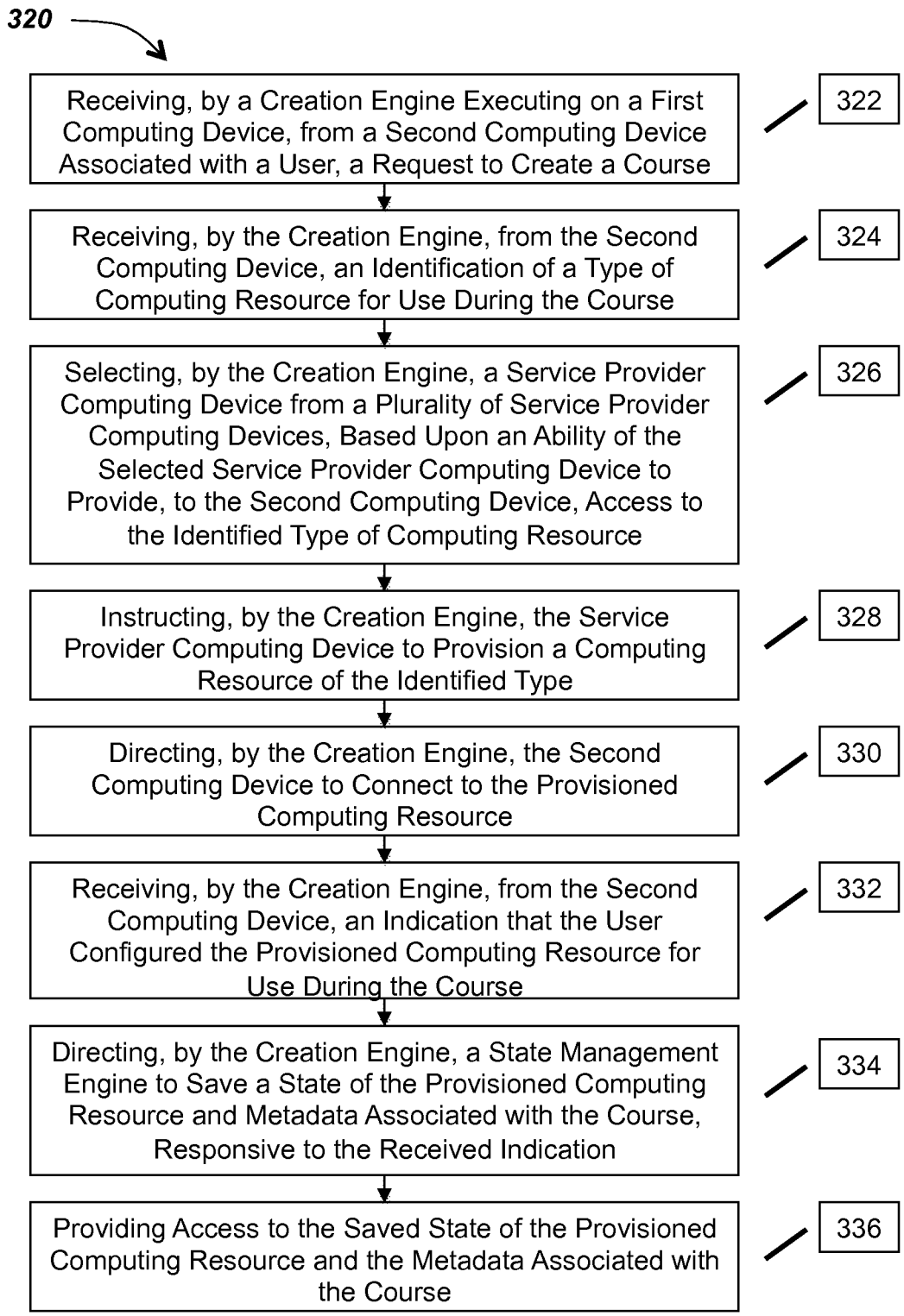
FIG. 3B is a flow diagram depicting an embodiment of a method for providing access to a course incorporating dynamically provisioned resources and on-demand courses.

Referring now to FIG. 3B, a flow diagram depicts one embodiment of a method 320 for providing access to a dynamically provisioned resource and an on-demand course. In brief overview, the method 320 includes receiving, by a creation engine executing on a first computing device, from a second computing device associated with a user, a request to create a course (322). The method 320 includes receiving, by the creation engine, from the second computing device, an identification of a type of computing resource for use during the course (324). The method 320 includes selecting, by the creation engine, a service provider computing device from a plurality of service provider computing devices, based upon an ability of the selected service provider computing device to provide, to the second computing device, access to the identified type of computing resource (326). The method 320 includes instructing, by the creation engine, the service provider computing device to provision a computing resource of the identified type (328). The method 320 includes directing, by the creation engine, the second computing device to connect to the provisioned computing resource (330). The method 320 includes receiving, by the creation engine, from the second computing device, an indication that the user configured the provisioned computing resource for use during the course (332). The method 320 includes directing, by the creation engine, a state management engine to save a state of the provisioned computing resource and metadata associated with the course, responsive to the received indication (334). The method 320 includes providing access to the saved state of the provisioned computing resource and the metadata associated with the course (336).

The method 320 includes receiving, by a creation engine executing on a first computing device, from a second computing device associated with a user, a request to create a course (322). In one embodiment, the creation engine receives the request as described above in connection with FIG. 3A.

The method 320 includes receiving, by the creation engine, from the second computing device, an identification of a type of computing resource for use during the course (324). In one embodiment, the creation engine receives the identification as described above in connection with FIG. 3A.

The method 320 includes selecting, by the creation engine, a service provider computing device from a plurality of service provider computing devices, based upon an ability of the selected service provider computing device to provide, to the second computing device, access to the identified type of computing resource (326). In one embodiment, the creation engine selects the services provider computing device as described above in connection with FIG. 3A.

The method 320 includes instructing, by the creation engine, the service provider computing device to provision a computing resource of the identified type (328). In one embodiment, the creation engine instructs the service provider computing device as described above in connection with FIG. 3A.

The method 320 includes directing, by the creation engine, the second computing device to connect to the provisioned computing resource (330). In one embodiment, the creation engine directs the second computing device as described above in connection with FIG. 3A.

The method 320 includes receiving, by the creation engine, from the second computing device, an indication that the user configured the provisioned computing resource for use during the course (332). In one embodiment, the creation engine receives the indication as described above in connection with FIG. 3A.

The method 320 includes directing, by the creation engine, a state management engine to save a state of the provisioned computing resource and metadata associated with the course, responsive to the received indication (334). In one embodiment, the creation engine directs the state management engine as described above in connection with FIG. 3A. In still another embodiment, the creation engine 202 stores identifications of types of computing resources required for completion of the course as metadata associated with course data. In yet another embodiment, the creation engine 202 stores, as metadata associated with the course data, an identification of the plurality of service provider computing devices 212 that can provide access to identified types of computing resources. In some embodiments, the creation engine 202 publishes an identification of the course. In one of these embodiments, the creation engine 202 makes the identification of the course available to individuals who may wish to take the course.

In some embodiments, the state management engine 205 receives the course information from the creation engine 202 and stores the information as course metadata. In one of these embodiments, the state management engine 205 stores the course metadata with the saved state provided as described above in connection with (314). In another of these embodiments, the combined state and metadata is bundled together and made available to users of the system.

The method 320 includes providing access to the saved state of the provisioned computing resource and the metadata associated with the course (336). In other embodiments, the instantiation engine 204 receives course information from the creation engine 202 and stores the information as course metadata. In one of these embodiments, the instantiation engine 204 stores the course metadata with the saved state provided as described above in connection with (314). In another of these embodiments, the combined state and metadata is bundled together and made available to users of the system.

In one embodiment, bundling the combined state data and metadata provides functionality for making courses available from a variety of locations. In another embodiment, the bundled state and metadata may be embedded into other courses. In still another embodiment, the bundled state and metadata may be embedded into other web sites. In some embodiments, the machine 106 stores the bundled state and metadata. In other embodiments, the service provider computing device 212 stores the bundled state and metadata. Furthermore, the system may associate a uniform resource locator (URL) with the bundled state and metadata to provide access to the course and its metadata. As an example, by providing a URL to a user, the system allows users to embed access to courses within electronic mail, documents, web sites, or other resources, allowing other users to directly access a course. In some embodiments, providing access includes offering for sale a copy of the saved state and the metadata. In other embodiments, providing access includes providing a subscription for accessing the saved state and the metadata.

Figure 4A:
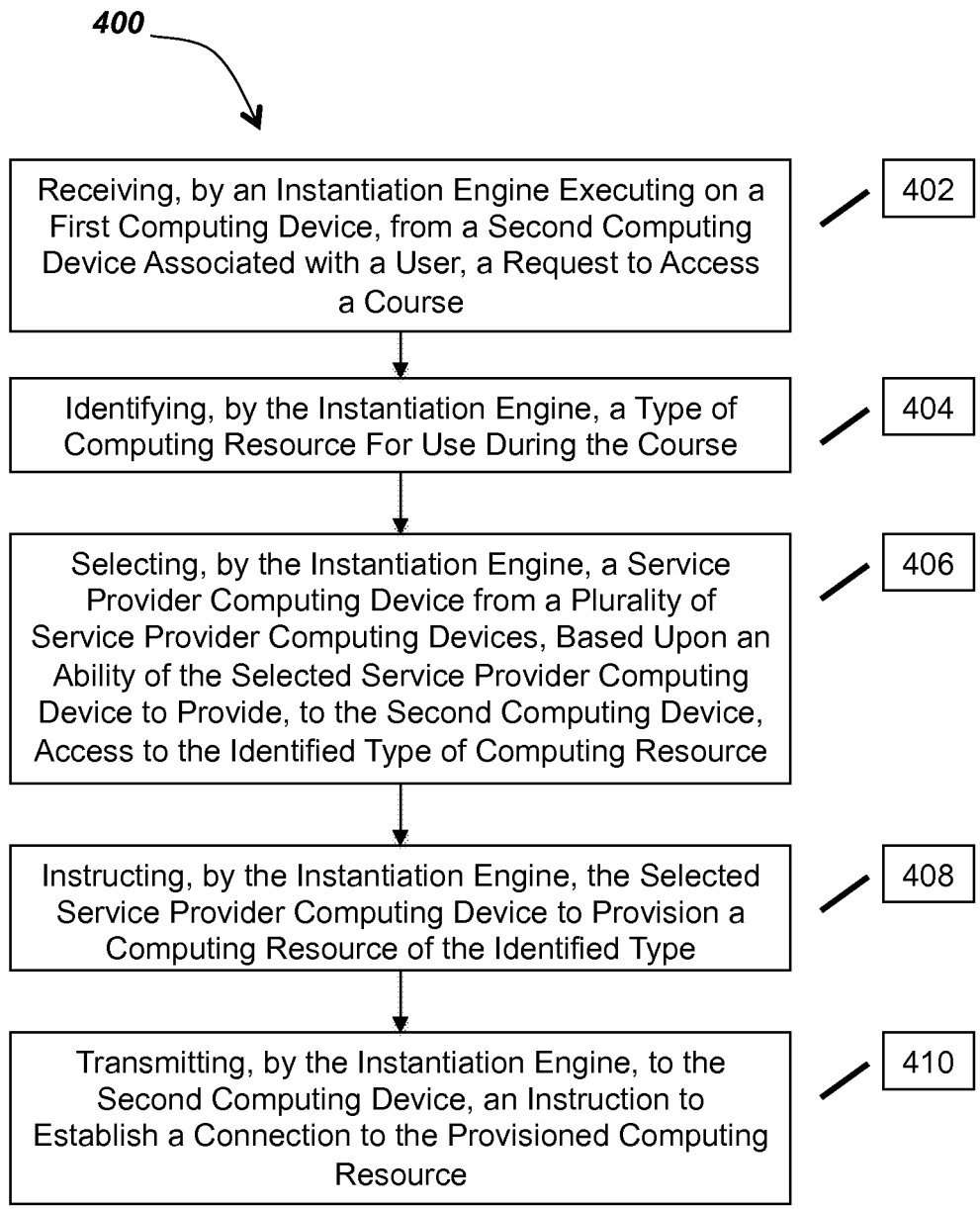
FIG. 4A is a flow diagram depicting an embodiment of a method for dynamically provisioning resources for on-demand courses.

Referring now to FIG. 4A, a flow diagram depicts one embodiment of a method for dynamically provisioning resources for on-demand courses. In brief overview, the method includes receiving, by an instantiation engine executing on a first computing device, from a second computing device associated with a user, a request to access a course (402). The method includes identifying, by the instantiation engine, a type of computing resource used during the course (404). The method includes selecting, by the instantiation engine, a service provider computing device from a plurality of service provider computing devices, based upon an ability of the selected service provider computing device to provide, to the second computing device, access to the identified type of computing resource (406). The method includes instructing, by the instantiation engine, the selected service provider computing device to provision a computing resource of the identified type (408). The method includes transmitting, by the instantiation engine, to the second computing device, an instruction to establish a connection to the provisioned computing resource (410).

Referring now to FIG. 4A in greater detail, and in connection with FIGS. 2-3B, an instantiation engine executing on a first computing device receives, from a second computing device associated with a user, a request to access a course (402). In one embodiment, the client 102 requests an enumeration of available courses. In another embodiment, the client 102b sends the request to access the course.

The method includes identifying, by the instantiation engine, a type of computing resource for use during the course (404). In one embodiment, the instantiation engine 204 retrieves data associated with the course; for example, the instantiation engine 204 may retrieve metadata associated with the course and identify resources required for use during the course. In another embodiment, the instantiation engine 204 transmits a request to the computing resource identification component 208 to retrieve an enumeration of identifications of types of computing resources for use during the course. In still another embodiment, the instantiation engine 204 queries a database to identify the type of computing resource used during the course. In yet another embodiment, the instantiation engine 204 retrieves state and metadata associated with the course.

The method includes selecting, by the instantiation engine, a service provider computing device from a plurality of service provider computing devices, based upon an ability of the selected service provider computing device to provide, to the second computing device, access to the identified type of computing resource (406). In one embodiment, the instantiation engine 204 directs the service provider selection component 206 to make the selection. In another embodiment, the instantiation engine 204 makes the selection of the service provider computing device 212a-n based upon pricing (e.g., the instantiation engine 204 selects a first service provider computing device 212b that provides access to the identified type of computing resource 220a-n for a lower price than a second service provider computing device 212c).

In some embodiments, the user of the client 102b will access a plurality of types of computing resources during the course. For example, and without limitation, the user of the client 102b may access a virtual machine running a particular operating system and storing course presentation data and also access a virtual hardware device on which to practice configuring the type of hardware device, or also access a second virtual machine running a second operating system on which the user may practice writing, compiling, and executing code in a particular programming language that is the subject of the course. In one of these embodiments, the instantiation engine 204 selects a first service provider computing device 212a to provide access to a computing resource 220a with a first type and the instantiation engine 204 selects a second service provider computing device 212b to provide access to a computing resource 220b with a second type. In another of these embodiments, the instantiation engine 204 selects one service provider computing device 212a to provide access to a computing resource 220a with a first type from a first data center and the instantiation engine 204 selects the same service provider computing device 212a to provide access to a computing resource 220b with a second type from a second data center.

In some embodiments, the user of the client 102b uses a plurality of clients 102 to access the course. For example, and without limitation, the user may access a client 102b to view a course presentation and may access a client 102c to complete an exercise. In one of these embodiments, the system provides functionality for customizing course data to accommodate a plurality of clients 102; for example, the instantiation engine 204 may direct the user to connect the client 102b to a first computing resource 220a to access a first type of course-related data and to connect the client 102c to a second computing resource 220b to access a second type of course-related data.

The method includes instructing, by the instantiation engine, the selected service provider computing device to provision a computing resource of the identified type (408). In one embodiment, the instantiation engine 204 executes an API command to provision the computing resource 220*a-n*. In another embodiment, the instantiation engine 204 provisions the computing resource 220*a* having the identified type when the user of the client 102*b* requests access to the course. In such an embodiment, the system provides dynamic provisioning of resources, instantiating the resources as required, as opposed to requiring the service provider computing device 212*a* to keep a plurality of computing resources 220*a-n* provisioned and constantly executing in order to be prepared for a request by the client 102*b*; not being locked in to a particular service providers resources may provide additional flexibility as the instantiation engine 204 can select different service providers at different times, taking advantage of different resources and different prices available from different service provides.

The method includes transmitting, by the instantiation engine, to the second computing device, an instruction to establish a connection to the provisioned computing resource (410). In one embodiment, the instantiation engine 204 instructs the provisioned computing resource to begin execution of course data (e.g., an application, presentation, or other course-related data). In another embodiment, the instantiation engine 204 transmits, to the second computing device, a uniform resource link with which the second computing device may access a provisioned computing resource 220.

In some embodiments, the user of the client 102*a* remotely accesses the provisioned computing resource 220*a* during the course. In one of these embodiments, the user of the client 102*a* modifies the provisioned computing resource 220*a*—for example, by completing an exercise in the course, modifying data stored by the provisioned computing resource 220*a*, or re-configuring the provisioned computing resource 220*a*. In another of these embodiments, the instantiation engine 204 determines that the user has modified the provisioned computing resource 220*a*. By way of example, the client 102*a* may inform the instantiation engine 204 that the user has issued a command modifying the provisioned computing resource 220*a*, or the provisioned computing resource 220*a* itself may transmit an indication of a modification to the instantiation engine 204. In still another of these embodiments, the instantiation engine 204 directs the service provider computing device 212 to store a state of the provisioned computing resource 220*a*. In yet another of these embodiments, the instantiation engine 204 directs the service provider computing device 212 to store a snapshot image of the provisioned computing resource 220*a*.

In one embodiment, the instantiation engine 204 makes a modified version of the course available for playback. In another embodiment, a user of the client 102*b* begins to execute the course, modifies the provisioned computing resource 220*a*, and disconnects from the provisioned computing resource 220*a* before completing the course. In some embodiments, by saving the state of the course, the instantiation engine 204 allows the user to effectively pause his execution of the course and later resume the execution of the course where he left off. In one of these embodiments, the instantiation engine 204 receives a request from a computing device associated with the user taking the course (either the client 102*b* or another client 102*c*). In another of these embodiments, the instantiation engine 204 identifies the type of computing resource used during the course. In still another of these embodiments, the instantiation engine 204 selects a second service provider computing device 212*b* from the plurality of service provider computing devices 212*a-n* and instructs the second service provider computing device 212*b* to provision a second computing resource 220*b* of the identified type. In another of these embodiments, the instantiation engine 204 instructs the second service provider computing device to retrieve the stored state of the course and resume execution of the course. In yet another of these embodiments, the instantiation engine 204 transmits, to the computing device that requested access to the course, an instruction to establish a connection to the provisioned second computing resources 220*b*.

In some embodiments, as mentioned above, the instantiation engine 204 stores metadata relating to a course. In one embodiment, the instantiation engine 204 stores metadata relating to a student's participation in a course such as, for example and without limitation, whether a student took a particular course, if so, which exercises or portions of the course the student completed, how long the student took to complete the course, and how much time the student spent on taking different courses. In another embodiment, the instantiation engine 204 provides the student-related metadata to a reporting engine (not shown), which may provide the information to the student (e.g., for tracking how much time they spend on training and for recommending similar courses), to a teacher of a course (for example, to provide insight into particular portions of a course where a student spent more time and might be inferred to be struggling or particularly interested), to a third party (such as an employer seeking to track how much time employees spend taking courses or to a vendor seeking to track how many customers spend time on courses for the vendor's products). Similarly, the instantiation engine 204 may track metadata relating to a teacher's involvement in a course and the creation engine 204 may track how long it takes someone to create a new course. The system may store such user-related metadata in a database either on the machine 106, local to the machine 106, or provided by a service provider computing device 212. A reporting engine may access the stored metadata to generate granular reports to provide to course creators, course takers, or third parties.

Figure 4B:
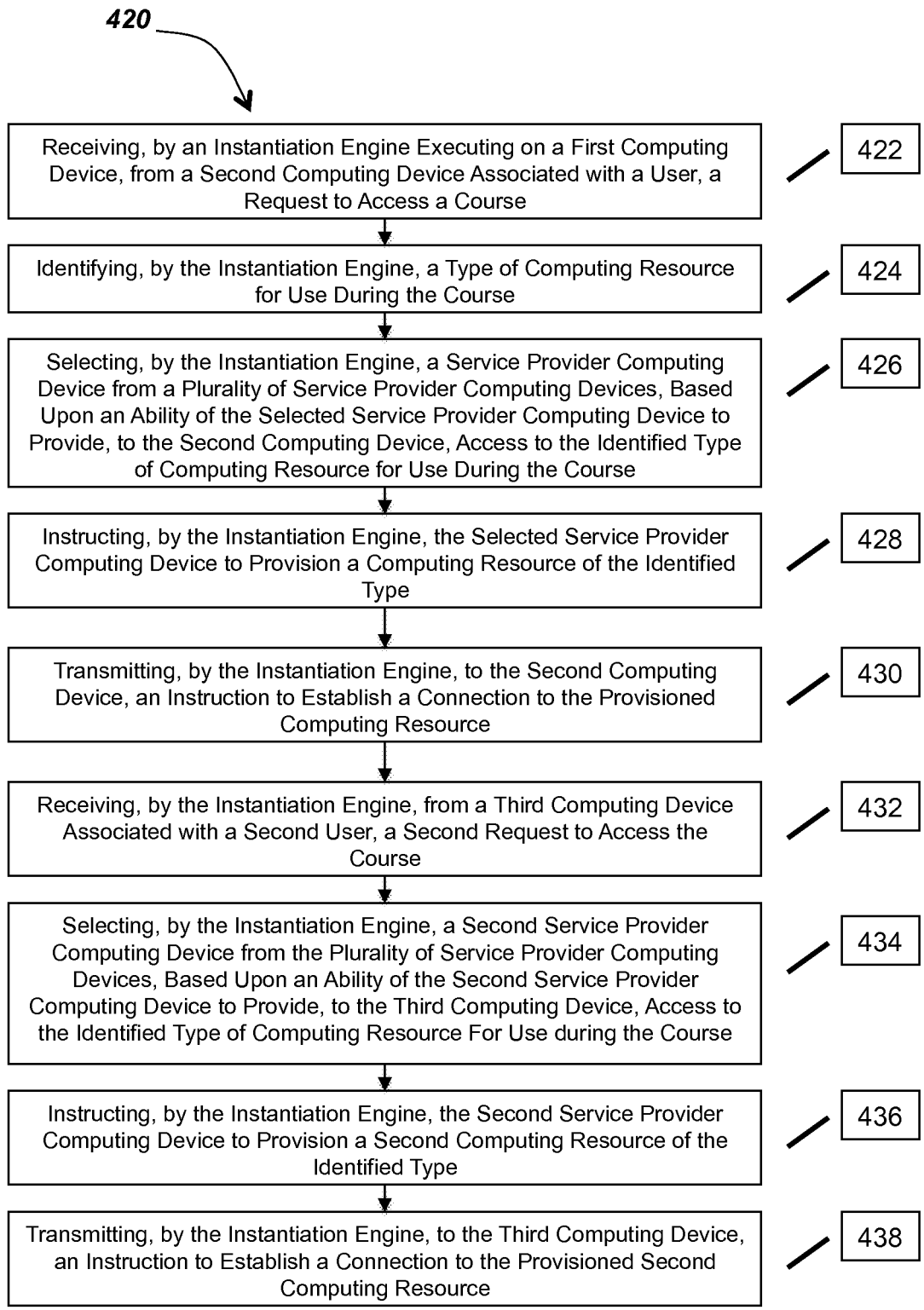
FIG. 4B is a flow diagram depicting an embodiment of a method for dynamically provisioning resources for an on-demand course to multiple users.

Referring now to FIG. 4B, a flow diagram depicts one embodiment of a method 420 for dynamically provisioning resources for an on-demand course to multiple users. In brief overview, the method 420 includes receiving, by an instantiation engine executing on a first computing device, from a second computing device associated with a user, a request to access a course (422). In one embodiment, the instantiation engine receives the request as described above in connection with FIG. 4A. The method 420 includes identifying, by the instantiation engine, a type of computing resource used during the course (424). In one embodiment, the instantiation engine identifies the type of computing resource as described above in connection with FIG. 4A. The method 420 includes selecting, by the instantiation engine, a service provider computing device from a plurality of service provider computing devices, based upon an ability of the selected service provider computing device to provide, to the second computing device, access to the identified type of computing resource (426). In one embodiment, the instantiation engine selects the service provider computing device as described above in connection with FIG. 4A. The method 420 includes instructing, by the instantiation engine, the selected service provider computing device to provision a computing resource of the identified type (428). In one embodiment, the instantiation engine instructs the selected service provider computing device as described above in connection with FIG. 4A. The method 420 includes transmitting, by the instantiation engine, to the second computing device, an instruction to establish a connection to the provisioned computing resource (430). In one embodiment, the instantiation engine transmits the instruction as described above in connection with FIG. 4A. The method 420 includes receiving, by the instantiation engine, from a third computing device associated with a second user, a second request to access the course (432). In one embodiment, the instantiation engine receives the request as described above in connection with FIG. 4A. The method 420 includes selecting, by the instantiation engine, a second service provider computing device from the plurality of service provider computing devices, based upon an ability of the second service provider computing device to provide, to the third computing device, access to the identified type of computing resource for use during the course (434). In one embodiment, the instantiation engine selects the second service provider computing device as described above in connection with FIG. 4A. The method 420 includes instructing, by the instantiation engine, the second service provider computing device to provision a second computing resource of the identified type (436). In one embodiment, the instantiation engine instructs the second service provider computing device as described above in connection with FIG. 4A. The method includes transmitting, by the instantiation engine, to the third computing device, an instruction to establish a connection to the provisioned second computing resource (438). In one embodiment, the instantiation engine transmits the instruction as described above in connection with FIG. 4A.

Figure 4C:
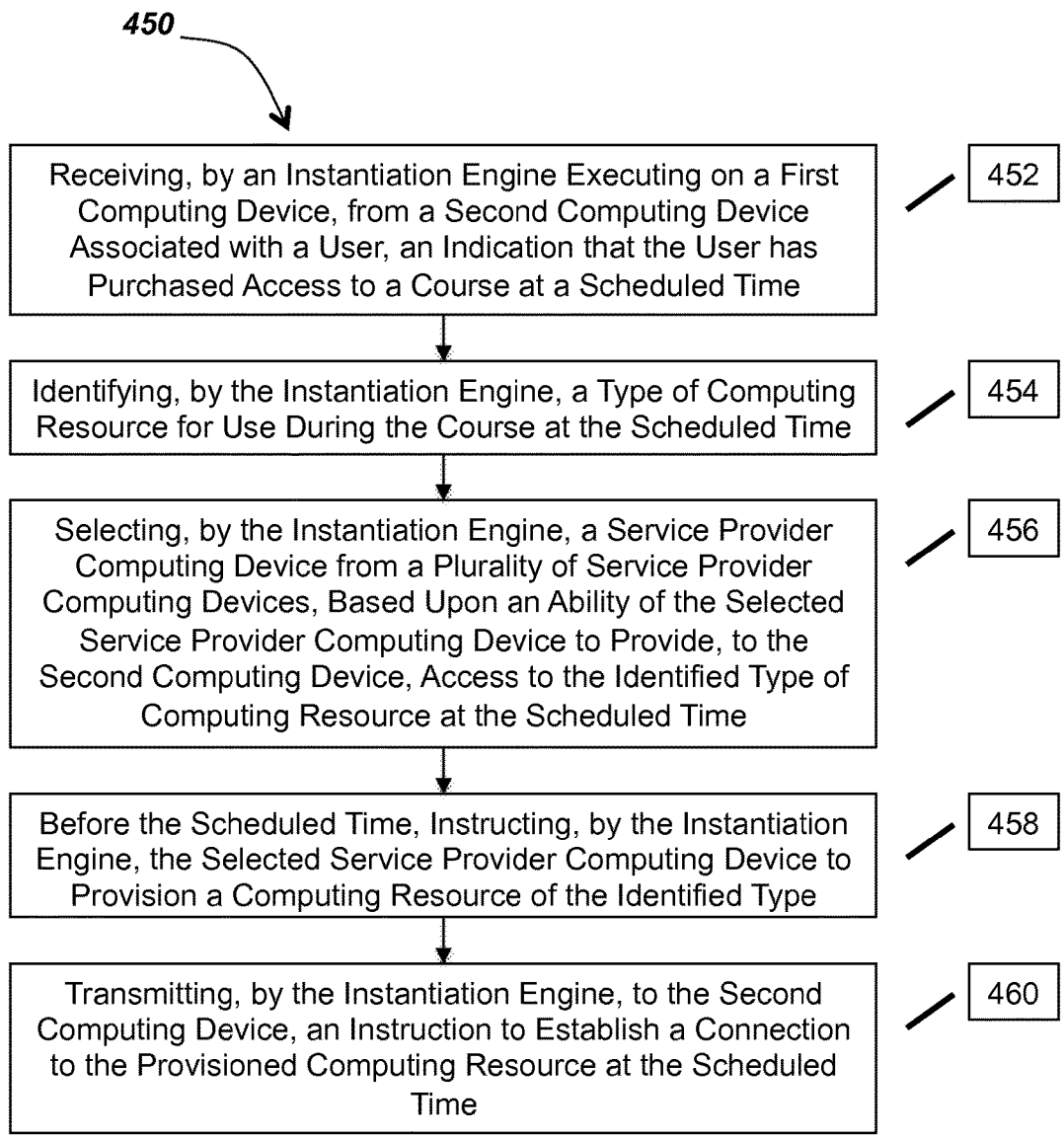
FIG. 4C is a flow diagram depicting an embodiment of a method for dynamically provisioning resources for an on-demand course at a scheduled time.

Referring now to FIG. 4C, a flow diagram depicts one embodiment of a method 450 for dynamically provisioning resources for an on-demand course at a scheduled time. In brief overview, the method 450 includes receiving, by an instantiation engine executing on a first computing device, from a second computing device associated with a user, an indication that the user has purchased access to the course at a scheduled time (452). In one embodiment, the instantiation engine receives the indication as described above in connection with FIG. 4A. The method 450 includes identifying, by the instantiation engine, a type of computing resource for use during the course at the scheduled time (454). In one embodiment, the instantiation engine identifies the type of computing resource as described above in connection with FIG. 4A. The method 450 includes selecting, by the instantiation engine, a service provider computing device from a plurality of service provider computing devices, based upon an ability of the selected service provider computing device to provide, to the second computing device, access to the identified type of computing resource at the scheduled time (456). In one embodiment, the instantiation engine selects the service provider computing device as described above in connection with FIG. 4A. The method 450 includes, before the scheduled time, instructing, by the instantiation engine, the selected service provider computing device to provision a computing resource of the identified type (458). In one embodiment, the instantiation engine instructs the selected service provider computing device as described above in connection with FIG. 4A. The method 450 includes transmitting, by the instantiation engine, to the second computing device, an instruction to establish a connection to the provisioned computing resource at the scheduled time (460). In one embodiment, the instantiation engine transmits the instruction as described above in connection with FIG. 4A.

In some embodiments, the methods and systems described herein provide functionality allowing individuals to rapidly and inexpensively create and share scalable, always-on, cloud-based solutions, with cloud economics. In other embodiments, the methods and systems described herein provide a platform for collaboration by establishing ongoing relationships between creators and users of such cloud-based solutions. In further embodiments, the methods and systems described herein provide functionality for utilizing data center infrastructure and resources to enable the rapid creation, deployment and management of hands-on training labs anywhere anytime; the labs may be destroyed after use, shared, or saved as part of a user resource library.

It should be understood that on-line courses, virtual labs, and hands-on training environments are one example of the types of applications for which the system provides creation and playback functionality. For example, another type of application may include a virtualized quality control test bed and yet another example includes virtualized customer support environments.

It should be understood that the systems described above may provide multiple ones of any or each of those components and these components may be provided on either a standalone machine or, in some embodiments, on multiple machines in a distributed system. The phrases 'in one embodiment,' in 'another embodiment,' and the like, generally mean that the particular feature, structure, step, or characteristic following the phrase is included in at least one embodiment of the present disclosure and may be included in more than one embodiment of the present disclosure. However, such phrases do not necessarily refer to the same embodiment.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data from a second computer providing access to the programs via a network transmission line, wireless transmission media, signals propagating through space, radio waves, infrared signals, etc.

Having described certain embodiments of methods and systems for dynamically provisioning resources for on-demand courses, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for creating and providing access to a dynamically provisioned course, the method comprising:
   receiving, by a creation engine executing on a first computing device, from a second computing device associated with a user, a request to create a course;
   receiving, by the creation engine, from the second computing device, an identification of a type of computing resource for use during the course;
   selecting, by the creation engine, a service provider computing device from a plurality of service provider computing devices based upon an ability of the selected service provider computing device to provide, to the second computing device, access to the identified type of computing resource;
   instructing, by the creation engine, the service provider computing device to provision a computing resource of the identified type;
   directing, by the creation engine, the second computing device to connect to the provisioned computing resource;
   receiving, by the creation engine, from the second computing device, an indication that the user configured the provisioned computing resource for use during the course;
   directing, by the creation engine, a state management engine to save a state of the provisioned computing resource and metadata associated with the course, responsive to the received indication; and
   providing access to the saved state of the provisioned computing resource and the metadata associated with the course.

2. The method of claim 1, wherein providing access further comprises providing a subscription for accessing the saved state and the metadata.

3. The method of claim 1, wherein providing access further comprises offering for sale a copy of the saved state and the metadata.

4. A method for dynamically provisioning resources for an on-demand course to multiple users, the method comprising:
   receiving, by an instantiation engine executing on a first computing device, from a second computing device associated with a user, a request to access a course;
   identifying, by the instantiation engine, a type of computing resource used during the course;
   selecting, by the instantiation engine, a service provider computing device from a plurality of service provider computing devices, based upon an ability of the selected service provider computing device to provide, to the second computing device, access to the identified type of computing resource;
   instructing, by the instantiation engine, the selected service provider computing device to provision a computing resource of the identified type;
   transmitting, by the instantiation engine, to the second computing device, an instruction to establish a connection to the provisioned computing resource;
   receiving, by the instantiation engine, from a third computing device associated with a second user, a second request to access the course;
   selecting, by the instantiation engine, a second service provider computing device from the plurality of service provider computing devices, based upon an ability of the second service provider computing device to provide, to the third computing device, access to the identified type of computing resource used during the course;
   instructing, by the instantiation engine, the second service provider computing device to provision a second computing resource of the identified type; and
   transmitting, by the instantiation engine, to the third computing device, an instruction to establish a connection to the provisioned second computing resource.

5. A method for dynamically provisioning resources for an on-demand course at a scheduled time, the method comprising:
   receiving, by an instantiation engine executing on a first computing device, from a second computing device associated with a user, an indication that the user has purchased access to the course at a scheduled time;
   identifying, by the instantiation engine, a type of computing resource for use during the course at the scheduled time;
   selecting, by the instantiation engine, a service provider computing device from a plurality of service provider computing devices, based upon an ability of the selected service provider computing device to provide, to the second computing device, access to the identified type of computing resource at the scheduled time;
   before the scheduled time, instructing, by the instantiation engine, the selected service provider computing device to provision a computing resource of the identified type; and
   transmitting, by the instantiation engine, to the second computing device, an instruction to establish a connection to the provisioned computing resource at the scheduled time.

* * * * *